F. W. KIEFER.
CORRESPONDENCE AND ARTICLE CARRIER.
APPLICATION FILED JAN. 15, 1915.
1,169,039.
Patented Jan. 18, 1916.
2 SHEETS—SHEET 1.
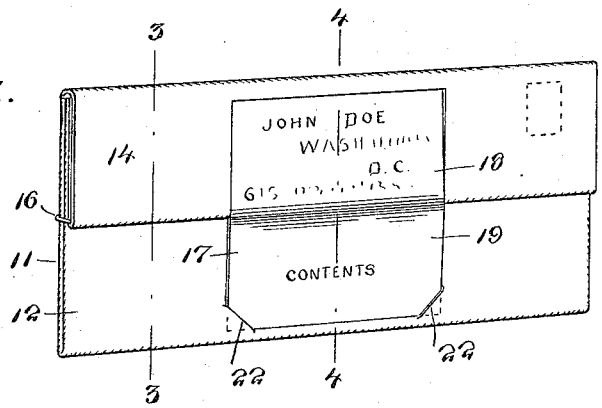
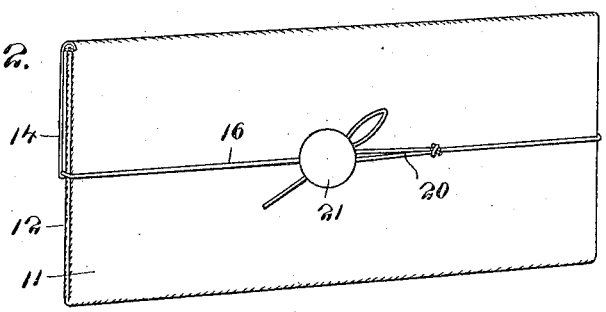
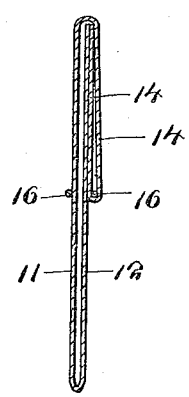
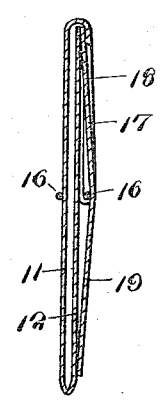
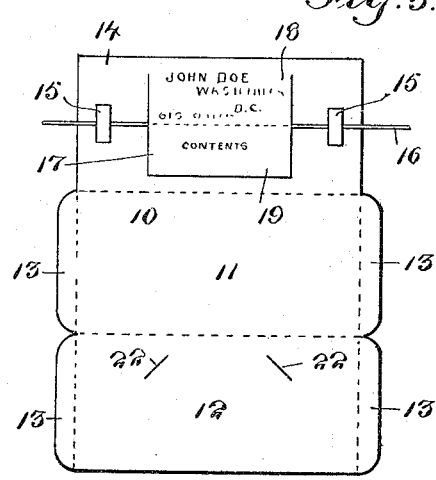
Inventor
Floyd W. Kiefer
By Victor J. Evans
Attorney

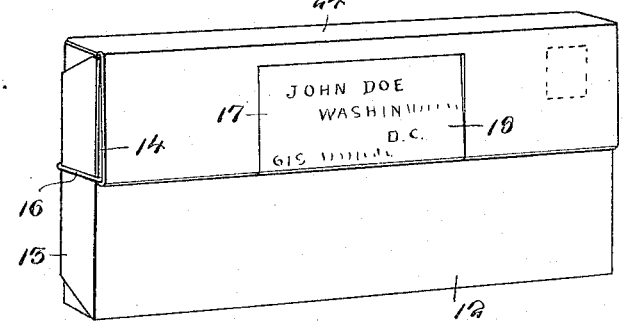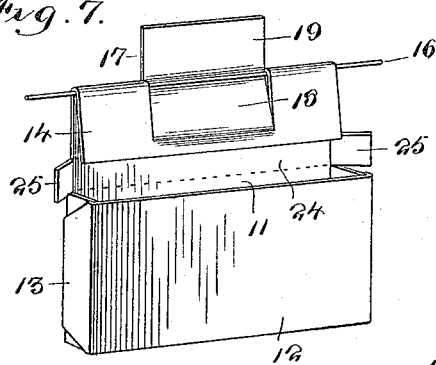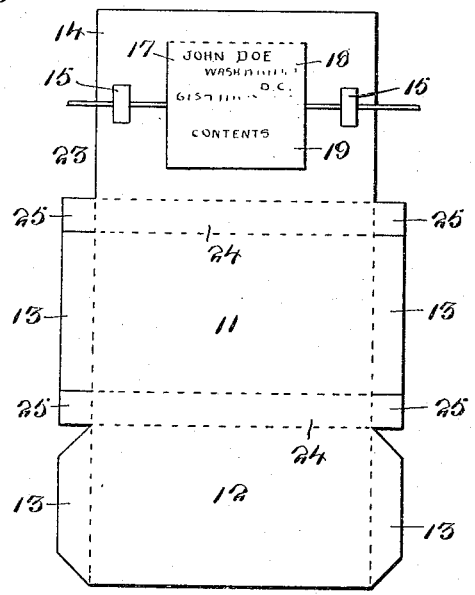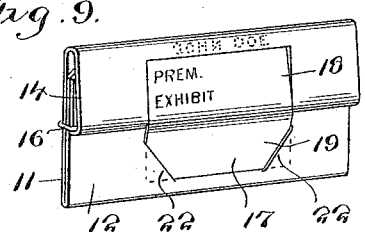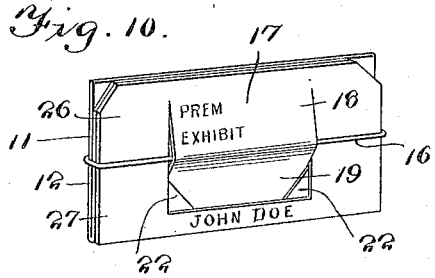

UNITED STATES PATENT OFFICE.

FLOYD W. KIEFER, OF SELLERSVILLE, PENNSYLVANIA.

CORRESPONDENCE AND ARTICLE CARRIER.

1,169,039.

Specification of Letters Patent.

Patented Jan. 18, 1916.

Application filed January 15, 1915. Serial No. 2,471.

*To all whom it may concern:*

Be it known that I, FLOYD W. KIEFER, a citizen of the United States, residing at Sellersville, in the county of Bucks and State of Pennsylvania, have invented new and useful Improvements in Correspondence and Article Carriers, of which the following is a specification.

The invention relates to devices for carrying correspondence, articles and the like, and has for an object to provide a simple device which can be readily sent through the mails to transport letters or any other kind of correspondence, such as advertising matter, post cards and the like, as well as articles, from one place to another.

The invention contemplates, among other features, the provision of a carrier which, due to its simple construction and the fact that it is formed of a single piece of material, permits of its being cheaply manufactured and the device, when in use, will act as a time saver in that articles can be readily packed therein with a few manipulations to secure the articles, letters and other correspondence matter being so arranged on or in the device so as to permit of the same being placed in condition for transportation through the mails with very little labor.

Still further objects of the invention reside in a structure which, when the carrier is closed or arranged in position to secure correspondence or articles, insures the concealment of the correspondence or articles in that the same will be locked and securely held within the carrier while at the same time, however, the postal authorities or other persons who must necessarily examine the contents of the package or determine what it contains, may readily inform themselves as to the contents of the package by partially unfolding a portion of the package without destroying the locking arrangement.

In the further disclosure of the invention reference is to be had to the accompanying drawings, constituting a part of this specification, in which similar characters of reference denote corresponding parts in all the views, and in which:

Figure 1 is a perspective view of the carrier, showing the same locked, but with the identification tab in open position so that the contents can be readily determined by the printed description thereof upon the tab; Fig. 2 is a perspective view showing the rear of the device disclosed in Fig. 1; Fig. 3 is a vertical transverse sectional view taken on the line 3—3 in Fig. 1; Fig. 4 is a vertical transverse sectional view taken on the line 4—4 in Fig. 1; Fig. 5 is an elevation of the blank; Fig. 6 is a perspective view of a slightly modified form of my device, showing the same more particularly adapted for use as an article carrier; Fig. 7 is a perspective view of the structure shown in Fig. 6 partially unfolded; Fig. 8 is an elevation of the blank used in forming the structure shown in Figs. 6 and 7; Fig. 9 is a perspective view of another form of my invention, showing the same adapted for a slightly different purpose; and Fig. 10 is a perspective view of the structure shown in Fig. 9, with the identification tab in exposed position.

Referring to the views, and more particularly to Fig. 5, I disclose a blank 10 preferably of cardboard or some other stiff material, and which is formed to provide portions 11 and 12 constituting the back and front respectively of the carrier. The portions 11 and 12 are preferably provided with end flaps 13 which are adapted to be bent upon the back and front for the purpose of holding the contents therebetween and preventing the same from slipping out between the ends of said back and front.

The portion 11 has formed therewith an extension 14 in the nature of a closure, and which, projecting from the upper edge of the back, is adapted to be folded forwardly after the front has been folded upon the back so that the extension, as shown in Fig. 1, will overlap the face of the front when the same has been folded upon the back. The extension 14 has a plurality of similar opposed holder tabs 15 struck therefrom as shown to secure a cord or binder 16, and struck from the extension 14 is a tab 17 preferably formed in two integral sections 18 and 19, one of which, namely, the section 18, is adapted to receive the address of the party to whom the carrier is sent, whereas the section 19 is adapted to have inscribed thereon the name of the contents of the carrier or any other descriptive matter that may be necessary in determining the contents of the package.

Referring now to Figs. 1 to 4, inclusive, it will be clearly seen that in preparing the carrier for the transportation of correspondence, post cards, or articles through the mails, the front 12 is folded upon the back 11, the flaps 13 having been previously bent inwardly upon their respective front and back, with the contents of the carrier adapted to lie between the front and back and held against longitudinal removal from between said front and back by the flaps 13. The extension 14 is now bent at substantially its medial portion and upon itself, the line of bending being along the line of the cord or binder 16, as shown in Fig. 3, and in a similar manner the tab 17 is bent along its medial portion to form the sections 18 and 19, with the section 19 adapted to lie beneath the section 18, the extension 14 when folded along its medial line as mentioned being adapted to overlap the face of the front 12 as clearly shown in Fig. 1.

The binder 16 has one of its ends formed to provide a loop 20 and the other longer end of the binder, together with the looped end thereof, is adapted to be arranged to extend across the rear of the carrier as shown in Fig. 2, the free or longer end of the binder being then arranged to pass through the loop 20, thus securing the extension 14 in its folded position, with a suitable slip knot formed with the free end of the binder after the same has passed through the loop and secured by a suitable seal 21 on the back, thus securing the binder against accidental removal or from becoming loosened to an extent which would tend to open and result in the displacement of the contents of the carrier. It will now be seen that the binder 16, operating in conjunction with the extension 14 when it has been arranged in the position shown in Figs. 1 and 3, securely locks the extension with respect to the body of the carrier and, as mentioned heretofore, the section 18 of the tab 17 receiving the address of the party to whom the carrier is sent, will clearly show the address as disclosed in Fig. 1. The front 12 is preferably provided with a plurality of inclined slits 22 which may be adapted to receive the free ends of the section 19 of the tab 17 as shown in Fig. 1 in cases where it is desired to have the contents of the package known to the postal authorities and in which instance the description of the contents is inscribed upon the section 19 as shown in Fig. 1, it being understood, however, that if desirable the section 19 can be folded beneath the section 17 as shown in Fig. 6, (the construction of which is hereinafter fully described) and will be held in this position by the binder extending longitudinally around the package and securing the extension.

In Figs. 6, 7 and 8 I disclose a slightly modified form of my invention and in which instance the blank indicated by the numeral 23 is substantially the same as the blank shown in Fig. 5, except that it is formed with spacing strips 24 constituting a part of the blank and which, when the blank is folded to form the carrier, will space the back and front 11 and 12 apart, as shown in Figs. 6 and 7 so that the carrier can be conveniently adapted for the transportation of merchandise through the mails, the flaps 13 shown in Fig. 8 being the same as the flaps 13 shown in Fig. 5 except that they are provided with additional flap portions 25 which, as shown in Fig. 7, aid in forming a compact carrier to more securely hold the contents therein.

In Figs. 9 and 10 I disclose still another modified form of my invention, in which the structure is precisely the same as shown in the other forms and particularly in Figs. 1, 2, 3, 4 and 5, the device in this instance, however, being particularly adapted to be used in connection with correspondence or other identification matter in a contest and wherein the carrier will perform the function of an entry ticket or the like to the extent that the section 18 of the tab 17 will have thereon the name of the exhibit, contest or other matter which is necessary therefor, the section 19 being secured in the slits 22 as clearly shown in Fig. 9. On the under side of the extension 14 and immediately adjacent the longitudinal edge forming the opening from which the tab is struck, the name of the entrant may be inscribed so that when the judge or person deciding the contest decides to determine the name of the party who is the successful one or the name of the particular entrant in the contest of which the contents of the carrier performed the successful part, it is only necessary to slit longitudinally the extension 14 at the point where the extension is bent at its medial portion, thus severing the extension so that it will be in two parts, indicated by the numerals 26 and 27, the part 27 being then bent downwardly and away from the binder 16 so as to disclose on its under side the name of the entrant as clearly shown in Fig. 10.

From the foregoing description it will be clearly seen that the device described is of a simple construction, it being made of a single piece of material and merely including the binder or cord for the purpose of holding the parts of the carrier together when the same is used to transport mail matter, correspondence or articles from one place to another. It will be noted, however, that as shown in the blank in Fig. 5, the visible faces of the portions 11 and 12 forming the back and front may be used for the correspondence and which can be typewritten or written directly upon the exposed or visible faces, the tab 17 in this instance, when the device is opened, after being sent to the party to whom it is addressed, having the name of the party at the top, together with the contents of the package or any other convenient matter that may be necessary therefor, with the written matter immediately beneath so that with the structure described the address of the party need only be written once and will constitute the means for identifying the package or carrier when it is sent to the party and also constitute the head of the letter contained within or upon the carrier when the same is subsequently opened by the party to whom it is addressed.

Having thus described my invention, I claim:

1. A correspondence and article carrier comprising a carrier body formed to provide a back and a front, with the latter adapted to be folded upon the former, an extension having a portion folded upon itself, said extension being formed with the back and adapted to be folded with respect thereto and overlap the front to form a closure for the carrier body, a binder passing along the folded portion of the extension and around the back to hold the extension in closed relation to the carrier body, an identification tab carried by the extension and foldable therewith, said identification tab being engaged by the binder to secure it in closer relation to said carrier body, and means for sealing said binder.

2. A correspondence and article carrier comprising a carrier body formed to provide a back and a front, with the latter adapted to be folded upon the former, an extension having a portion folded upon itself, said extension being formed with the back and adapted to be folded with respect thereto and overlap the front to form a closure for the carrier body, a binder passing along the folded portion of the extension and around the back to hold the extension in closed relation to the carrier body, an identification tab carried by the extension and foldable therewith, said identification tab being engaged by the binder to secure it in closed relation to said carrier body, a loop on one end of said binder and through which the other end of the binder is passed, and means associated with the binder and the carrier body adjacent said loop to seal said binder upon the carrier body.

3. In a correspondence and article carrier, in combination with a body, an extension foldable on said body to form a closure therefor and also foldable along its medial portion and overlying a portion of said body, and an identification tab struck from said extension and foldable along its medial portion to coincide with the other portion and lie beneath the same.

4. In a correspondence and article carrier, in combination with a body, a foldable extension thereon, said extension being folded along its medial portion, and a binder lying in the medial folded portion of the extension and extending longitudinally thereof to pass around the body for holding the extension in its folding position and against the body.

5. In a correspondence and article carrier, in combination with a body, a foldable extension integral therewith, said extension being folded, a binder lying in the fold of the extension and extending longitudinally thereof to pass around the body for holding the extension in its folded position and against the body, and an identification tab struck from said extension and folded to coincide with the fold of the extension, with said binder lying in the fold of said identification tab to secure said tab in folded relation to said extension and body.

6. A correspondence and article carrier comprising a body formed to provide a back and front, with the latter adapted to be folded upon the former, an extension having a portion folded upon itself, said extension being formed with a back and adapted to be folded with respect thereto and overlap the front to form a closure for the body, and a binder lying in the folded portion of the extension and carried about the body to hold the extension in closed relation to the latter.

7. A correspondence and article carrier comprising a body, an extension having a portion folded upon itself, said extension adapted to be folded with respect to the body and overlap the front thereof to form a closure for the body, a binder confined within the fold of the extension and engaged about the body to hold the extension folded on the body, and an identification tab carried by the extension and foldable therewith, said identification tab having the binder engaged therewith to secure it in closed relation to the said body.

In testimony whereof I affix my signature in presence of two witnesses.

FLOYD W. KIEFER.

Witnesses:
  F. A. HOSTER,
  BENNETT S. JONES.